Oct. 6, 1931.    H. IHRIG    1,826,400

RUBBER CUSHION SHACKLE

Filed May 29, 1929

Inventor
Henry Ihrig
By Blackmore, Spencer & Huth
Attorneys

Patented Oct. 6, 1931

1,826,400

UNITED STATES PATENT OFFICE

HENRY IHRIG, OF LANSING, MICHIGAN, ASSIGNOR TO GENERAL MOTORS CORPORATION, OF DETROIT, MICHIGAN, A CORPORATION OF DELAWARE

RUBBER CUSHION SHACKLE

Application filed May 29, 1929. Serial No. 367,020.

In a well constructed automotive vehicle, which is provided with semi-elliptic front load-carrying leaf springs which are connected at their front ends to the side members of the chassis frame by pivot bolts and at their rear ends to the side members of the chassis frame by shackles, steering wheel kick results principally from three causes, viz., front wheel tramp, front wheel shimmy and the movement of the road wheel which is carried by the steering knuckle, which carries the steering arm, when it encounters a bump in the road. Front wheel tramp and front wheel shimmy, in themselves, without regard to their effect on steering, are highly objectionable.

Steering wheel kick, which results from the causes mentioned above, front wheel tramp and front wheel shimmy can be greatly reduced, if not entirely eliminated, by connecting the front end of the front spring on the side of the vehicle on which the steering arm is provided on the steering knuckle to the chassis frame by means which allows a limited amount of resiliently opposed movement of the spring and the adjacent end of the front axle, longitudinally of the spring. It is, however, preferable to shackle the front springs at their front instead of their rear ends and to secure the rear end of the spring, on the side of the vehicle on which the steering arm is provided on the steering knuckle, to the chassis frame by means which allows a limited amount of resiliently opposed movement of the spring and the adjacent end of the front axle, longitudinally of the spring.

My invention relates generally, to devices for connecting an end of a leaf spring to a supporting or a supported member, so as to allow a limited amount of resiliently opposed movement of the spring longitudinally of itself, and, particularly, to such a device which is peculiarly adapted for use in connecting one end of the front spring, which is located on the side of the vehicle on which the steering arm is provided on the steering knuckle, to the chassis frame so as to eliminate steering wheel kick, front wheel tramp and front wheel shimmy.

The invention resides in the provision of a unit which consists of a bracket, which is adapted to be secured to the chassis frame of an automotive vehicle, and a shackle, which is pivoted at one end to the bracket and is adapted to be pivoted at its opposite end to one end of a load-carrying leaf spring, and a member extending through an intermediate portion of the shackle and a resilient sleeve which is secured against movement on the bracket.

For a better understanding of the nature and the objects of the present invention, reference is made to the following specification in which is described the preferred embodiment of my invention, which is illustrated in the accompanying drawings.

Figure 1:
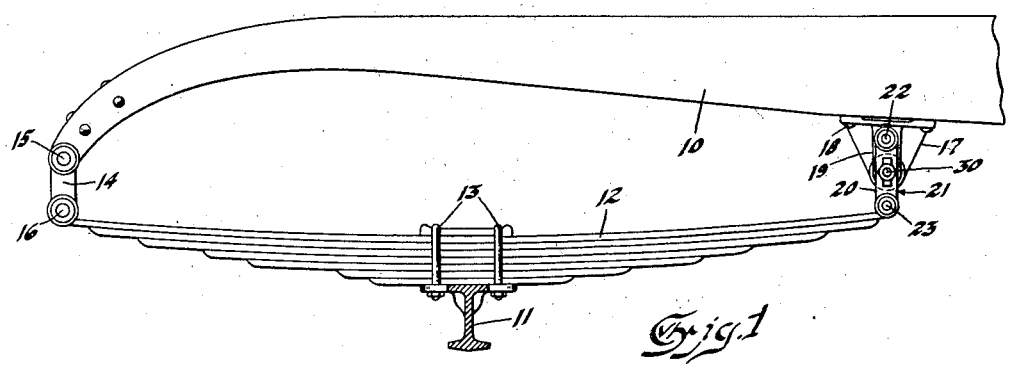
Figure 1 is a view showing, in side elevation, the front end of the side member on the steering side of the chassis frame, and the associated load-carrying spring of an automotive vehicle.
Figures 2, 3:
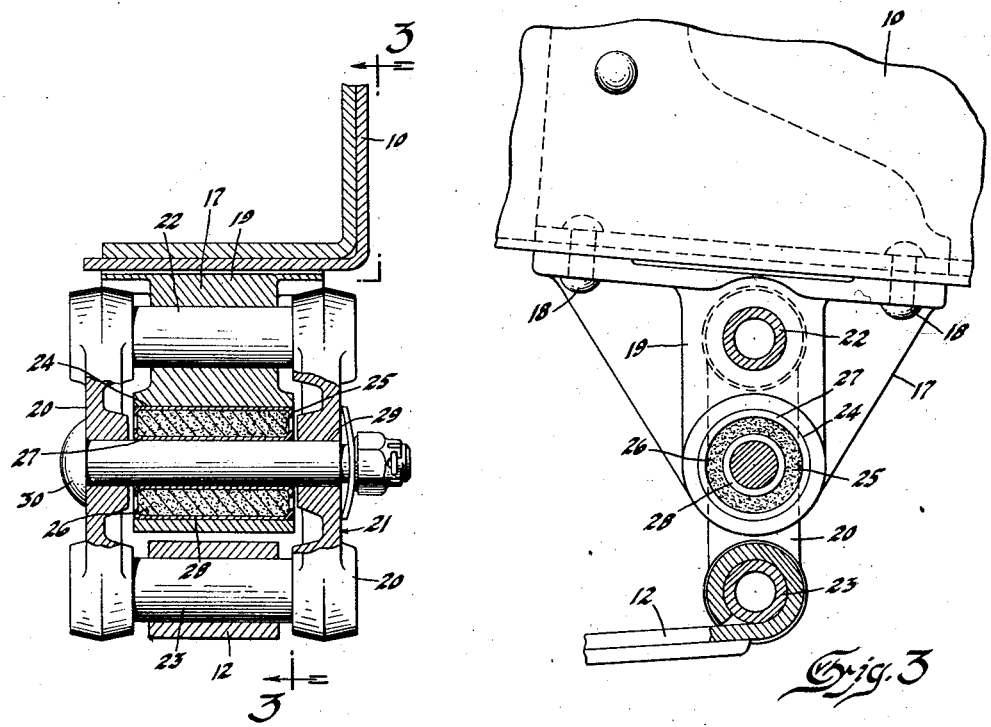
Figure 2 is an enlarged view showing the rear connection of the spring to the chassis frame partly in section and partly in elevation.
Figure 3 is a view taken as indicated by the line 3—3 of Figure 2.

In the drawings, the reference character 10 indicates the chassis frame of an automotive vehicle. To support the front end of the vehicle from the road wheels, there are provided an axle 11 and load-carrying leaf springs 12, which are secured to the axle by means of U-bolts 13. The front ends of the springs 12 are connected to the front ends of the side members of the chassis frame by means of shackles 14, which are connected to the chassis frame by pivot bolts 15 and to the springs by pivot bolts 16.

To connect the rear end of the spring 12 on the side of the vehicle on which the steering arm is provided on the steering knuckle to the adjacent side member of the chassis frame, there is provided a bracket 17 which is secured to the chassis frame by rivets 18. On the bracket there is provided a depending lug 19 on the opposite sides of which are positioned the upper ends of the links 20 of a shackle 21. The upper ends of the links are connected to the base of the lug 19 by means of a pivot member 22 which extends through the links and the base of the lug. The lower ends of the links 20, which are located below the outer end of the lug, are connected by a pivot member 23 to which the rear end of the spring 12 is pivotally connected.

Through the lower end of the lug there extends a bore 24, in which is fixed a resilient unit 25, which consists of a rubber bushing 26, encased in inner and outer steel sleeves 27 and 28, which are flanged at their outer ends. Through openings 29 provided in the intermediate portions of the shackle links 20, and through the inner sleeve 28 there extends a bolt 30.

While vertical forces applied to the shackle 21 through the spring 12 will have no tendency to cause it to swing about the pivot 22 which connects it to the bracket, movement of the spring 12 longitudinally of itself will cause the shackle to rock about the pivot 22. This pivotal movement of the shackle will cause the initially loaded or compressed rubber bushing 26 to be compressed between the inner and outer steel sleeves 27 and 28, and, consequently, the pivotal movement of the shackle will be resiliently opposed, the movement of the spring longitudinally of itself will be resiliently cushioned, and steering wheel kick, front wheel shimmy and front wheel tramp will be eliminated.

Although I have shown and described a preferred embodiment of my invention, it is to be understood that this has been done by way of example and not by way of limitation, and that the scope of my invention is to be limited only by the appended claims.

I claim:

1. In a device of the class described, a bracket, a lug depending from the bracket, a link positioned on each side of the bracket, a pivot member extending through extremities of the links and the base of the lug, registering openings in intermediate portions of the links and the outer end of the lug, a resilient unit consisting of a resilient sleeve encased in metallic sleeves fixed in the opening in the lug, a member extending through the openings in the links and the inner sleeve, and a pivot member connecting the other extremities of the links.

2. In a motor vehicle, a driving connection between a load supporting spring and the vehicle frame, including a pair of spaced shackle links connected at one end to the spring, a frame bracket affording a connection for the other ends of said links and having an extension projecting into the space between said links, with an opening therein alined with openings in both links intermediate their end connections, a pin carried by the links and fitted within the openings therein for projection through the opening in said bracket extension in spaced relation to the wall thereof, and elastic deformable material in the space between the pin and wall of the opening to yieldingly restrain shackle link movement.

3. In a motor vehicle, a driving connection between a load supporting spring and the vehicle frame, including a pair of spaced shackle links connected at opposite ends to the spring and frame respectively, a unit for transmitting driving thrust between the spring and frame while accommodating limited movement of the shackle links to damp the effect of road action in the vehicle steering mechanism, including inner and outer members adapted for attachment, one to the shackle and the other to the frame and elastic deformable material interposed between said members for elastic deformation upon shackle movement.

4. In a motor vehicle, a driving connection between a load supporting spring and the vehicle frame, including a pair of spaced shackle links connected at opposite ends to the spring and frame respectively, a unit for transmitting driving thrust between the spring and frame while accommodating limited movement of the shackle links to damp the effect of the road action in the vehicle steering mechanism, including concentric inner and outer members disposed in spaced relation with each other between the shackle links, one of said members being connected with an intermediate portion of said links and the other being connected with the frame and resilient means between said members to yieldably resist their relative movement.

In testimony whereof I affix my signature.

HENRY IHRIG.